US010242337B2

(12) United States Patent
Jordan et al.

(10) Patent No.: US 10,242,337 B2
(45) Date of Patent: Mar. 26, 2019

(54) METHOD, APPARATUS, AND COMPUTER PROGRAM PRODUCT FOR DISPENSING PRODUCTS

(71) Applicant: McKesson Corporation, San Francisco, CA (US)

(72) Inventors: Michael Jordan, Alpharetta, GA (US); Brian Williams, Scottsdale, AZ (US); Merle Hertzler, West Chester, PA (US)

(73) Assignee: McKesson Corporation, San Francisco, CA (US)

( * ) Notice: Subject to any disclaimer, the term of this patent is extended or adjusted under 35 U.S.C. 154(b) by 25 days.

(21) Appl. No.: 15/081,315

(22) Filed: Mar. 25, 2016

(65) Prior Publication Data

US 2017/0278049 A1 Sep. 28, 2017

(51) Int. Cl.
*G06Q 10/08* (2012.01)
*G07F 17/00* (2006.01)

(52) U.S. Cl.
CPC ....... *G06Q 10/087* (2013.01); *G07F 17/0092* (2013.01)

(58) Field of Classification Search
CPC .................................................. G07F 17/0092
USPC ................................................ 700/231–244
See application file for complete search history.

(56) References Cited

U.S. PATENT DOCUMENTS

| 6,522,945 | B2 * | 2/2003 | Sleep ..................... B65B 5/103 53/493 |
| 7,783,383 | B2 * | 8/2010 | Eliuk ........................ A61J 1/20 141/1 |
| 7,930,066 | B2 * | 4/2011 | Eliuk ........................ A61J 1/20 700/245 |
| 8,386,070 | B2 * | 2/2013 | Eliuk ........................ A61J 1/20 141/1 |
| 9,579,255 | B2 * | 2/2017 | Eliuk ........................ A61J 1/20 |
| 2004/0193317 | A1 * | 9/2004 | Lunak ..................... B65G 1/12 700/243 |
| 2008/0125897 | A1 * | 5/2008 | DiGianfilippo ......... A61J 3/002 700/110 |

* cited by examiner

*Primary Examiner* — Michael Collins
(74) *Attorney, Agent, or Firm* — Alston & Bird LLP (57) ABSTRACT

Example embodiments of the present invention may provide a method of dispensing a product having a verified identity to be labeled and packaged without requiring additional validation and verification. According to an example embodiment, a dispensing system may include a display, a workstation, a user interface, and a controller. The controller may be configured to receive an indication that the workstation is clear of any products, such as products associated with a previous dispensing operation. The controller may: receive provide for presentation on the display of an identification of a batch of a first product type to be retrieved in response to the indication that the workstation is clear; receive an identification of a batch of products of a first product type that is received at the workstation; and identify a queue of orders for the first product type as maintained in a memory.

20 Claims, 9 Drawing Sheets

METHOD, APPARATUS, AND COMPUTER PROGRAM PRODUCT FOR DISPENSING PRODUCTS

FIELD OF THE INVENTION

The present invention relates to the dispensing of articles using a dispensing system, and more particularly to providing a method, apparatus, and computer program product for dispensing a product having a verified identity to be labeled and packaged without requiring additional validation and verification.

BACKGROUND

Dispensing systems are often used to dispense one or more different types of articles, particularly in large-scale distribution centers that provide products to various customers and retailers. Dispensing of products, particularly in large-scale systems can be fraught with opportunities for errors. While some degree of erroneous dispensing may be tolerated in various industries where cost and consequence are low, other industries may require a much higher level of accuracy in the dispensing of products. High levels of accuracy may require more manual labor for checking, verifying, and re-checking dispensed goods, and the identification of goods that are dispensed. Even in automated dispensing systems, the automation is only as good as the identification of the products dispensed. Mislabeled products may go unrecognized by automated systems.

High throughput volumes and high dispensing accuracy levels may be difficult to maintain in a highly efficient manner such that one dispensing system aspect may be compromised in favor of another. Lower throughput with higher accuracy and higher throughput with lower accuracy, can each be costly to a distributor. It is desirable to increase accuracy while increasing throughput in an efficient and consistent manner.

SUMMARY

Example embodiments of the present invention may provide a method, system, and computer program product for dispensing a product having a verified identity to be labeled and packaged without requiring additional validation and verification. According to an example embodiment, a dispensing system may include a display, a workstation, a user interface, and a controller. The controller may be configured to receive an indication that the workstation is clear of any products, such as products associated with a previous dispensing operation. The controller may: identify a queue of orders for a first product type as maintained in a memory; provide for presentation on the display of an identification of a batch of the first product type to be retrieved in response to the indication that the workstation is clear; receive an identification of a batch of products of the first product type that is received at the workstation; determine a next order from the queue of orders; provide for presentation on the display of the next order of the queue of orders for the first product type; receive an indication of a product of the first product type dispensed from the batch of products of the first product type; cause a label to be printed for the next order; and provide for presentation of an indication that the dispensed product of the first product type corresponds to the next order. Providing for presentation of an indication that the dispensed product of the first product type corresponds to the next order may include determining if the identification of a dispensed product of the first product type corresponds to the next order.

According to some embodiments, receiving an identification of a dispensed product of the first product type may include receiving data from a barcode on the dispensed product from a barcode scanner in communication with the controller. Receiving an identification of a batch of products of a first product type that is received at the workstation may include receiving an identifier corresponding to a barcode on the retrieved batch of products. An identification of a batch of a first type of product received at the workstation may include an identification of a registered pharmacist that has confirmed that the batch includes only products of the first product type. The printed label may be printed in response to the identification of the product of the first product type corresponding to a product of the next order from the order queue. The indication that the workstation is clear may be received from a registered pharmacist. The controller may optionally be configured to modify the queue of orders for the first product type in the memory to remove the next order in response to the next order being filled; and advance a second order in the queue to become a new next order in the queue of orders stored in the memory. The queue of orders may be modified to remove the new next order in response to the new next order being filled, and repeating this operation until the quantity of the first product type in the batch is exhausted.

According to some embodiments, a method may be provided for operating a dispensing system having a workstation, a display, and a user interface. The method may include: receiving an indication via the user interface that the workstation is clear of any products; identifying a queue of orders for a first product type as maintained in a memory; providing for presentation of an identification of a batch of the first product type to be retrieved in response to the indication that the workstation is clear; receiving an indication of a batch of products of the first product type received at the workstation; receiving confirmation that each product in the batch of products is of a first product type; determining a next order from the queue of orders; providing on the display the next order from the queue of orders for the first product type; receiving an identification of a product of the first product type dispensed from the batch of products of the first product type; causing a label to be printed for the next order in the queue of orders for the first product type; and providing an indication that the next order has been filled correctly. Methods may include providing for display of an indication that the product dispensed from the batch of products is of the first product type in response to the identification received corresponding the first product type.

According to some embodiments, receiving an identification of the product dispensed may include receiving a scanned identification from a barcodes scanner. The confirmation that each product in the batch of products is of a first product type may be received from a registered pharmacist. Causing a label to be printed for the next order in the queue of orders may be performed in response to the identification of the product of the first product type corresponding to the next order. Methods may include providing for presentation on the display of an indication that a retrieved product from the batch of products does not correspond to the next order in the queue of orders for the first product; and providing an alert in response to the retrieved product not corresponding to the next order. Methods may include advancing the next order via a conveyor to a packaging station. Methods may optionally include modifying the queue of orders for the first product type in the memory to remove the next order in response to the next order being filled; and advancing a second order in the queue to become a new next order in the queue of orders stored in the memory.

Embodiments may provide a computer program product having at least one non-transitory computer readable medium with computer-executable program code instructions stored therein. The computer-executable program code instructions may include program code instructions for: receiving an indication via the user interface that the workstation is clear of any products; identifying a queue of orders for a first product type as maintained in a memory; providing for presentation of an identification of a batch of the first product type to be retrieved in response to the indication that the workstation is clear; receiving an indication of a batch of products of the first product type received at the workstation; receiving confirmation that each product in the batch of products is of a first product type; determining a next order from the queue of orders; providing on the display the next order from the queue of orders for the first product type; receiving an identification of a product of the first product type dispensed from the batch of products of the first product type; causing a label to be printed for the next order in the queue of orders for the first product type; and providing an indication that the next order has been filled correctly. The computer program product may include program code instructions for providing for display of an indication that the product dispensed from the batch of products is of the first product type in response to the identification received corresponding to the first product type. The program code instructions for receiving an identification of the dispensed product may include program code instructions for receiving a scanned identification from a barcode scanner.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Figure 1:
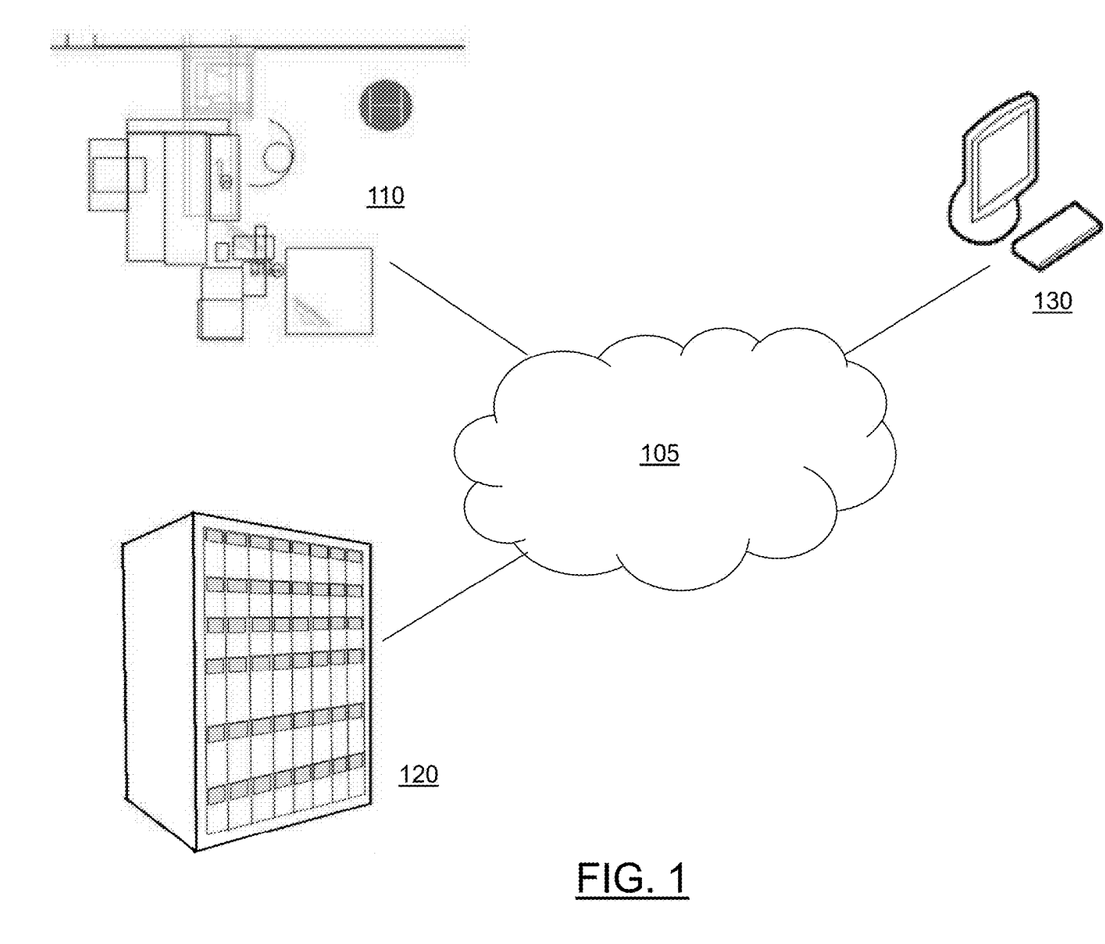
FIG. 1 illustrates a system that can be used in conjunction with various embodiments of the present invention.

FIG. 1 provides an illustration of a system that can be used in conjunction with various embodiments of the present invention. As shown in FIG. 1, an example embodiment may include a dispensing system 110, one or more networks 105, a batch storage unit 120, and a product review station 130. Embodiments may include other network entities from which data may be received from or transmitted to, as will be further described below. Each of the components of the system may be in electronic communication with, for example, one another over the same or different wireless or wired networks (e.g., network 105), including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture. Further, while the illustrated embodiment of FIG. 1 depicts a product review station 130 that is separate from the dispensing system 110 and the batch storage unit 120, example embodiments may include where the dispensing system and approval station are a single entity.

Figure 2:
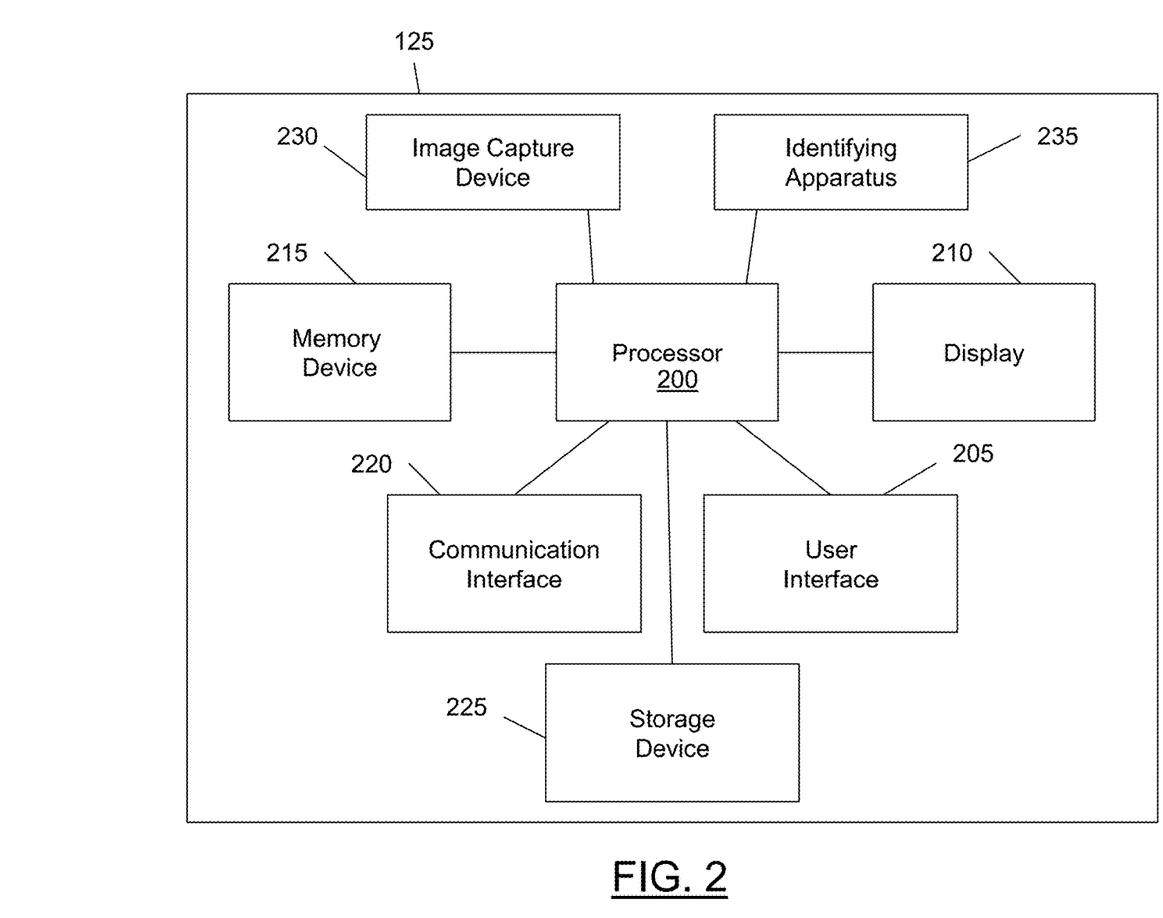
FIG. 2 illustrates a schematic diagram of a dispensing system controller according to an example embodiment of the present invention.

Example embodiments of the dispensing system 110 as described herein may include a controller configured to control or otherwise monitor and facilitate activities performed at the dispensing system. FIG. 2 provides a schematic of an example embodiment of a controller 125 of a dispensing system 110. In general, the term "controller" may refer to, for example, any computer, computing device, mobile phone, desktop, tablet, notebook or laptop, distributed system, server, blade, gateway, switch, processing device, or combination of processing devices adapted to perform the functions described herein. The dispensing system controller 125 may include, be associated with, or be in communication with a variety of computing entities, such as pharmacy distribution center management systems, batch storage units 120, data storage/facilitation computing entities, or other devices that may interface with inventory management, dispensing, etc. While example embodiments of dispensing systems may be implemented in virtually any setting which may benefit from automated dispensing of articles, embodiments described herein will be described generally with respect to the field of healthcare in which medications, medical devices, and other articles may be dispensed for patients or caregivers. However, it is appreciated that embodiments of the present invention may apply to various other embodiments of automated dispensing systems and devices.

As will be understood from FIG. 2, in one embodiment, the dispensing system controller 125 may include a processor 200 that communicates with other elements of the dispensing system controller 125 via a system interface or bus. The processor 200 may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an example embodiment, the processor 200 may be configured to execute instructions stored in memory or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the dispensing system controller 125 may be configured, among other things, to facilitate accurate dispensing of prescription orders of an automatic or semi-automated dispensing system. The dispensing system controller 125 may also be used to create an audit trail for the dispensing of articles for an automated or semi-automated dispensing system and provide a mechanism for approvals or certification of various steps of the dispensing process. A user interface 205 may be configured for user input to initiate the dispensing process or to confirm, advance, or otherwise interact with operations of the dispensing process. The user interface 205 may include a keyboard, a pointing device, or other mechanism for a user to communicate with the processor 200 and interact with the dispensing system controller 125.

Dispensing system controller 125, according to example embodiments, may further include or be in communication with a display 210 which may be configured to present information to a user pertaining to the dispensing process and to communicate alerts or confirm success of various steps of the dispensing process. The display 210 may also be configured to present information to a user pertaining to the status of the dispensing system, information regarding inventory or batches, or any information which may be useful to a user of the device. The display 210 may include a touch screen display which may partially or fully comprise the user interface 205, or the user interface 205 may be a separate entity, such as a keyboard, touchpad, mouse pointer, etc. As noted above, example embodiments may include a dispensing system that also incorporates the product review station. In such an embodiment, the user interface 205 and display 210 may be used for the approval process of the audit trail that is further detailed below.

The dispensing system controller 125 may further include or be in communication with an image capture device 230. The image capture device may include a still camera, a video camera, a thermal imaging camera, and/or the like. The image capture device 230 of embodiments of the present invention may be used to capture images and/or video of various stages of the dispensing process as will be further detailed below. Embodiments of the controller may further include or be in communication with an identifying apparatus 235 configured to identify an items or individuals used or involve in the dispensing process, such as a batch of a first product type received at the dispensing system, a product being dispensed, a user, an approval authority, or the like. The identifying apparatus 235 may include an apparatus with a processor, such as a barcode scanner, an image capture device configured to recognize alpha-numeric indicia or other identifying marks, an RFID reader, or the like.

The dispensing system controller 125 may further include transitory and non-transitory memory device 215, which may include both random access memory (RAM) and read only memory (ROM). The ROM may be used to store a basic input/output system (BIOS) containing the basic routines that help to transfer information to the different elements within the dispensing system controller 125.

In addition, in one embodiment, the dispensing system controller 125 may include at least one storage device 225, such as a hard disk drive, a CD drive, and/or an optical disk drive for storing information on various computer-readable media. The storage device(s) 225 and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. The storage device may be configured to store, for example, an audit trail of operations, errors, alerts, and approvals of a dispensing process together with an identifier of the user and/or the approving authority responsible for a respective dispensing process.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the dispensing system controller 125 with the assistance of the processor 200 and operating system, although their functionality need not be modularized. In addition to the program modules, the dispensing system controller 125 may store or be in communication with one or more databases.

Also located within the dispensing system controller 125, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the dispensing system controller 125 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the dispensing system controller's 125 components may be located remotely from other dispensing system controller components. For example the storage device 225 may be located on a remote network entity. Furthermore, one or more of the components may be combined and additional components performing functions described herein may be included in the dispensing system controller 125.

The dispensing of products in a high-volume distribution center involves many stages of checks and verification to ensure that the products dispensed are accurate to an order for a product. Automating the process of dispensing may be desirable, but may also introduce additional errors in the distribution process. Automated systems rely upon proper labeling of a product, the source of the product, and the quantities of a product, where an error upstream in the manufacturing, packaging or dispensing process may cascade throughout the dispensing process and adversely affect the dispensing of tens, hundreds, or even thousands of products. Manual dispensing of products may enable additional checks and verifications; however, manual dispensing is generally very time consuming and introduces additional cost to the dispensing process. Embodiments described herein integrate both manual and automated aspects of dispensing into a process that minimizes dispensing errors and provides the necessary level of checks and verifications to properly comply with various regulations that may affect the dispensing of various products.

One type of product in which the accuracy of dispensing is very critical is that of medication. Medication dispensing errors can be costly and potentially harmful. Thus, certified personnel are required to ensure medication dispensing is carried out properly and accurately as prescribed by a physician. Pharmacist checks and verification are generally required throughout the dispensing process as a certain degree of responsibility and training is necessary to ensure proper dispensing of the correct medications. The need for a pharmacist to be physically present to verify dispensed products individually is both costly and inefficient. Throughput of products in a high-volume distribution center may be limited by the speed of the pharmacists available to verify medication dispensing accuracy.

Conventional medication dispensing may include having a product manually picked by a technician who scans the product (e.g., via barcode scanner), manually labels the product, and then places the product in a tote, canister, or onto a conveyor. The product may then be transported to a station for inspection by a pharmacist. Once the pharmacist performs his or her physical verification of each product, the product may be moved to a packaging station. This process is manually intensive and requires considerable time and labor for each individual product.

A dispensing system according to an example embodiment of the present invention may be used to dispense products of a first type from a batch of products exclusively of the first type. The system may fill and pack single product orders in batches according to their stock keeping unit (SKU). The dispensing system of example embodiments may include a station operated under supervision of a pharmacist, where the pharmacist may perform checks and verifications on the process and batches without requiring manual, laborious verification of each individual product dispensed.

Figure 3:
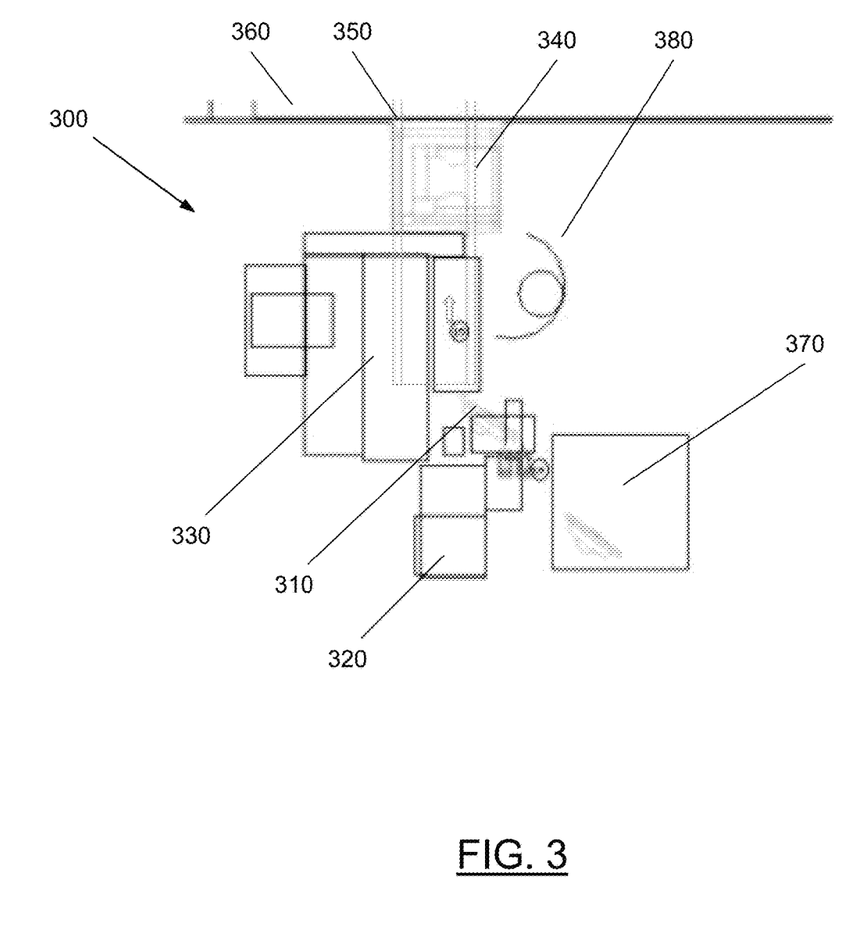
FIG. 3 illustrates an example embodiment of a dispensing system workstation which may benefit from example embodiments of the present invention.

FIG. 3 illustrates an example embodiment of a workstation 300 of a dispensing system according to an example embodiment of the present invention. The workstation 300 may be located within a high-volume distribution facility, and may be one of a plurality of workstations. The workstations of a facility may be arranged along a conveyor, as will be detailed further below. Optionally, a workstation may be employed in a facility other than a high-volume distribution facility, such as in a pharmacy, a retail store, a mail-order distribution center, or any facility that fulfills orders for products, particularly for a plurality of orders for a single type of product.

The workstation 300 of the illustrated dispensing system may include a display 310 such as an liquid crystal display (LCD), light-emitting-diode (LED) display, or the like, which may correlate with display 210 of the controller 125 of FIG. 2. The display may be in communication with a user interface (e.g. user interface 205 of FIG. 2), which may be embodied by a keyboard, pointing device (e.g., trackball, track pad, mouse, etc.), or the like. The user interface may optionally be incorporated with the display 310 as a touchscreen display where user input is received through a user touching the display 310. The display 310 and the user interface may be in communication with, for example, a controller as depicted in 125. The illustrated workstation 300 may also include a printer 320, such as a label printer which may print indicia related to an order for a first product to a label with an adhesive backing for application to the first product or to a container into which the first product is to be placed when the order is filled. The depicted workstation 300 further includes a bagging station 330 that may be used for receiving an ordered first product into a bag upon dispensing. The illustrated embodiment further includes a documentation printer 340 configured to print documentation related to a filled order, and the documentation printer 340 may be disposed along a discharge conveyor 350 used to convey a filled order that has been bagged (at bagging station 330) to another conveyor 360 for advancing to a packaging station prior to shipment, as detailed further below. The workstation 300 may optionally include the illustrated work table 370 which may be used for receiving a batch of products of a first type to be dispensed at the workstation 300.

A batch storage unit 120 may be located proximate to or remote from the workstation 300. The batch storage unit may store a plurality of batches of various different product types for dispensing at a workstation 300. Further, a product review station 130 may be located proximate to or remote from the workstation 300, where one or more operations performed at the workstation may be reviewed and/or verified at the product review station 120 by an authorized person, such as a pharmacist. The product review station may include an apparatus similar to that illustrated in FIG. 2, having a processor 200, a user interface 205, a display 210, and a communications interface 220.

The dispensing system of example embodiments may be used to fill and pack products of a single type (e.g., a single SKU) from a batch of products of that type at the workstation 300. The dispensing system may be operated by a user (e.g., a technician) under supervision of an individual or group of individuals with certain authorities to confirm order fulfillment accuracy. In an example embodiment of a pharmaceutical distribution center, the user may be a technician, while the dispensing system is under the supervision of one or more credentialed pharmacists. The dispensing system described herein requires less manual interaction with the dispensed products and requires fewer verification steps by a pharmacist in order to increase throughput while reducing cost and increasing efficiency of the dispensing of products. According to example embodiments described herein, this can be accomplished without sacrificing accuracy.

Figure 4:
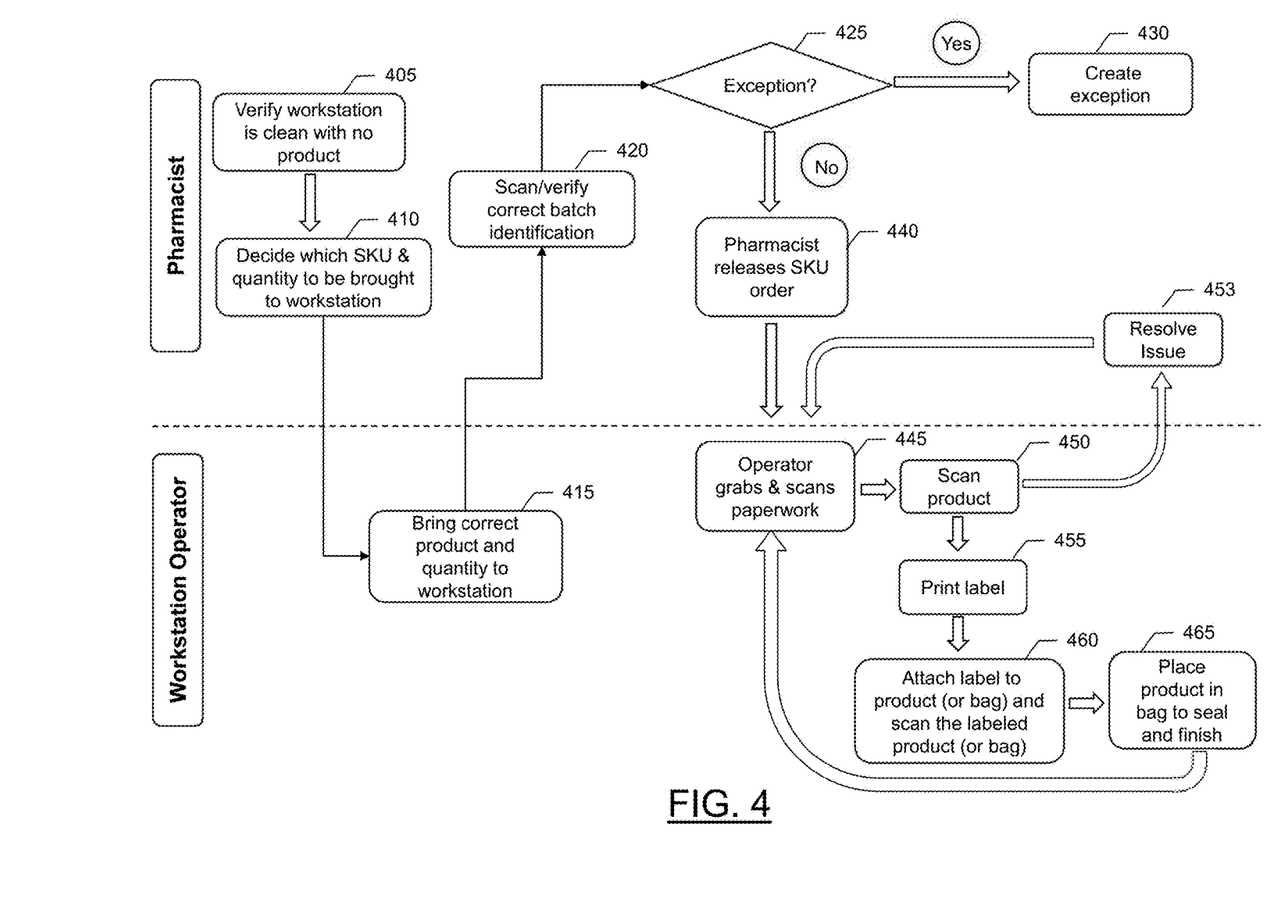
FIG. 4 is a flowchart of a method of operating a dispensing system according to an example embodiment of the present invention.

An example embodiment of a method of operation of a dispensing system of the present invention is provided in the flowchart of FIG. 4 that illustrates the operations and responsibilities of operators of the dispensing system. While the dispensing system of example embodiments can be implemented in a variety of distribution facilities for distribution of various products, the example embodiment of FIG. 4 is directed to the distribution of pharmaceutical products such as medications in a pharmaceutical distribution center. The process may begin with a pharmacist verifying that the workstation is clear with no products present at 405. This operation ensures that there are no products left over from another operation, or any products present at the workstation that may be inadvertently used to fill an order for a different product. Upon determining that the workstation is clear with no product, the pharmacist may provide confirmation of the station readiness to the controller 125, such as through user interface 205, which may be embodied by, for example, a keyboard. The pharmacist may also need to confirm his or her identity when providing confirmation that the station is clear in order to ensure that the operation was completed by an individual with the proper authority, and this confirmation of identity may be stored along with the operation in an audit trail for the dispensing system, such as in storage device 225, for use in determining root cause of any errors or resolving issues with the dispensing of products.

A plurality of orders may be received at the dispensing system (e.g., at controller 125 via communications interface 220), or at a central controller where the orders are grouped into queues according to their National Drug Code (NDC), which may correspond with a particular SKU. These queues of orders may be presented to a pharmacist (e.g., via user interface 205 and/or display 210) for selection as to which queue is to be released to a dispensing system. The pharmacist may determine which queue is to be released to a workstation of the dispensing system, where the queue includes both a product and the quantity of that product that is to be brought to the workstation at 410. The NDC or SKU is indicative of a single product type such that each product assigned a particular SKU is identical and interchangeable. The selection of an order queue by the pharmacist may be established based on a number of orders for a particular product in a queue, an age of the orders for a particular product in a queue, or a code, such as an urgency code associated with a particular product queue. Once the queue is identified, a batch of products each having the SKU and/or NDC of that order queue may be retrieved, such as from batch storage device 120, by the workstation operator at 415 and brought to the workstation. The pharmacist may scan and verify that the correct product has been retrieved and delivered to the workstation as shown at 420. The scanning may be performed by identifying apparatus 235 and/or interface 205. At this operation, the pharmacist is responsible for ensuring that all products in the batch brought to the workstation are identical, and that the retrieved batch of products is as requested at 410. The dispensing system may prohibit any orders from being labeled or packed until the batch of products is verified by the pharmacist. Each of the plurality of orders in the selected queue may be released by processor 200 for order filling at the workstation as the pharmacist has approved the order queue.

Figure 5:
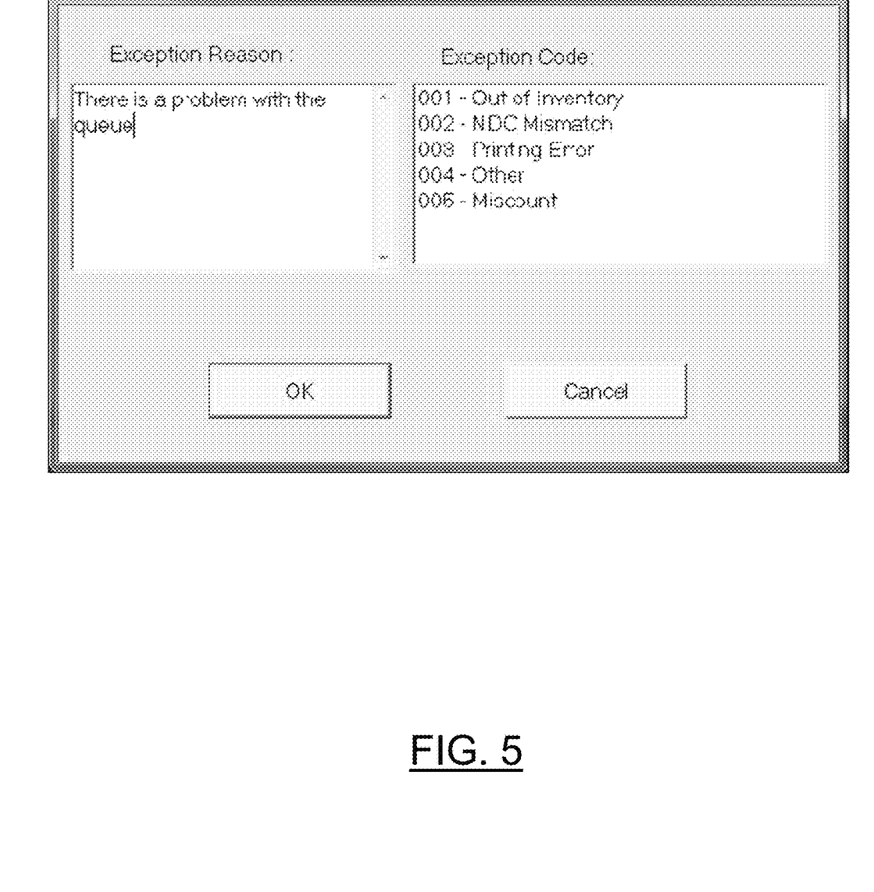
FIG. 5 is an illustration of an operator screen of a user interface for a dispensing system workstation according to an example embodiment of the present invention.

The order queue released by the pharmacist at 410 and verified at 420 may include exceptions. If an exception is needed for a released and verified queue at 425, the exception may be created at 430. FIG. 5 illustrates an example embodiment of the creation of an exception at 430. The pharmacist may enter an exception reason, and select an exception code to accompany the orders of the queue, and to be entered into a memory stored as part of the audit trail from filling the orders of the order queue. Exceptions may be made for a lack of inventory for a particular product where the orders are to be filled with a substitute product, or where an NDC may have changed for a product and the old NDC may be stored in the queue, such that an exception for NDC (or SKU) mismatch may be generated. The exceptions generated at 430 require pharmacist approval. If no exception is needed, the pharmacist may release the order queue for the SKU or NDC at 440.

Once the order queue for the SKU is released at 440, a first order in the order queue may be presented to the operator for fulfillment, such as via display 310 of the workstation 300. Paperwork associated with the order to be filled may be printed in response to the orders being released at 440 and the first order in the order queue being presented to the operator. At 445, an operator, such a technician, may obtain and scan the paperwork of an order associated with the batch of products of the SKU or NDC of the order selected by the pharmacist. The operator may be instructed to scan paperwork using identifying apparatus 235 via display 310 of the dispensing system 300. The paperwork may be scanned by, for example, an identifying apparatus 235, such as a barcode scanner or radio frequency identification (RFID) reader. The operator may be guided through the scanning of various barcodes of an order through instructions on the display 310.

Figure 6:
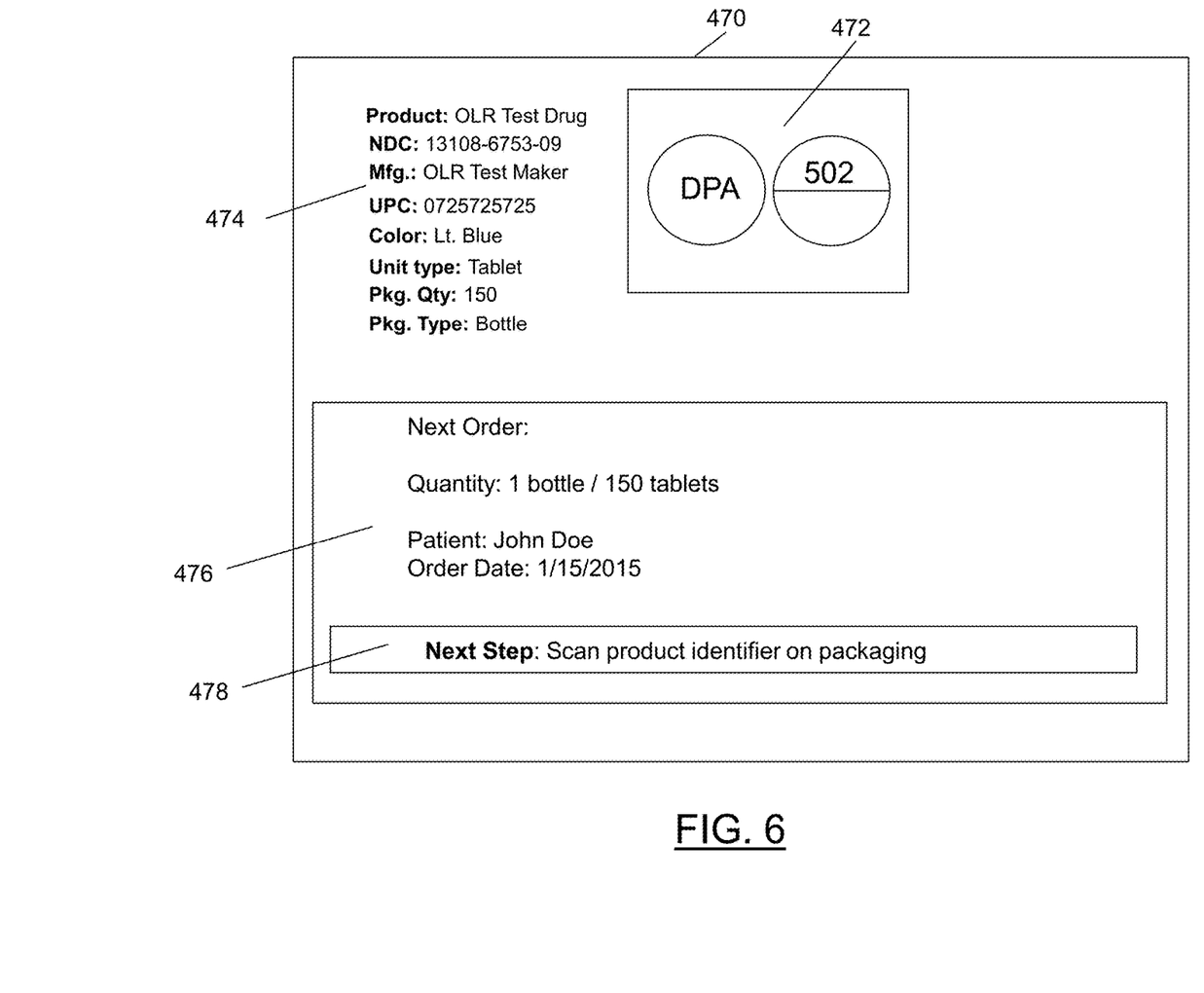
FIG. 6 illustrates a graphical user interface of an operator screen for a dispensing system workstation according to another example embodiment of the present invention.

Once the paperwork for the order is scanned at 445, or possibly in response to the pharmacist releasing the SKU order at 440, the display 210 may present to the operator a reference image of the medication or medication packaging. FIG. 6 illustrates an example embodiment of a graphical user interface which may be presented on a display 210 to an operator. As shown, the graphical user interface 470 may present identifying information 474 regarding the first product type together with a reference image 472 of the first product type. Alternatively, the image could be of the packaging of the article that is being dispensed, such as an image of the bottle. The graphical user interface 470 may further include order information 476. The display may further provide instruction to the operator to scan an identifier (e.g., using identifying apparatus 235) of an item retrieved by the operator to fulfill the order as shown at 450 of FIG. 4, and illustrated as an instruction as depicted on graphical user interface 470 at instruction 478 of FIG. 6.

Referring back to FIG. 4, a label for the retrieved product to fill the first order may be printed at 455 in response to the scanned product corresponding to the order identified in the paperwork of 445. However, if the scanned product at 450 fails to correspond to the product anticipated for the paperwork of 445, an alert may be generated that requires a pharmacist to resolve the issue at 453. In some cases, an alert or error may be triggered by the scanning of the wrong or unanticipated paperwork. For example, if an order is presented to a user to be filled, such as on display 210, and the paperwork scanned at 445 fails to correspond to the anticipated paperwork corresponding to the order, the process may bypass 450 and trigger an error or alert requiring intervention by the pharmacist at 453. Once the pharmacist resolves the issue of at 453, the next order may be scanned by the operator at 445.

Figure 7:
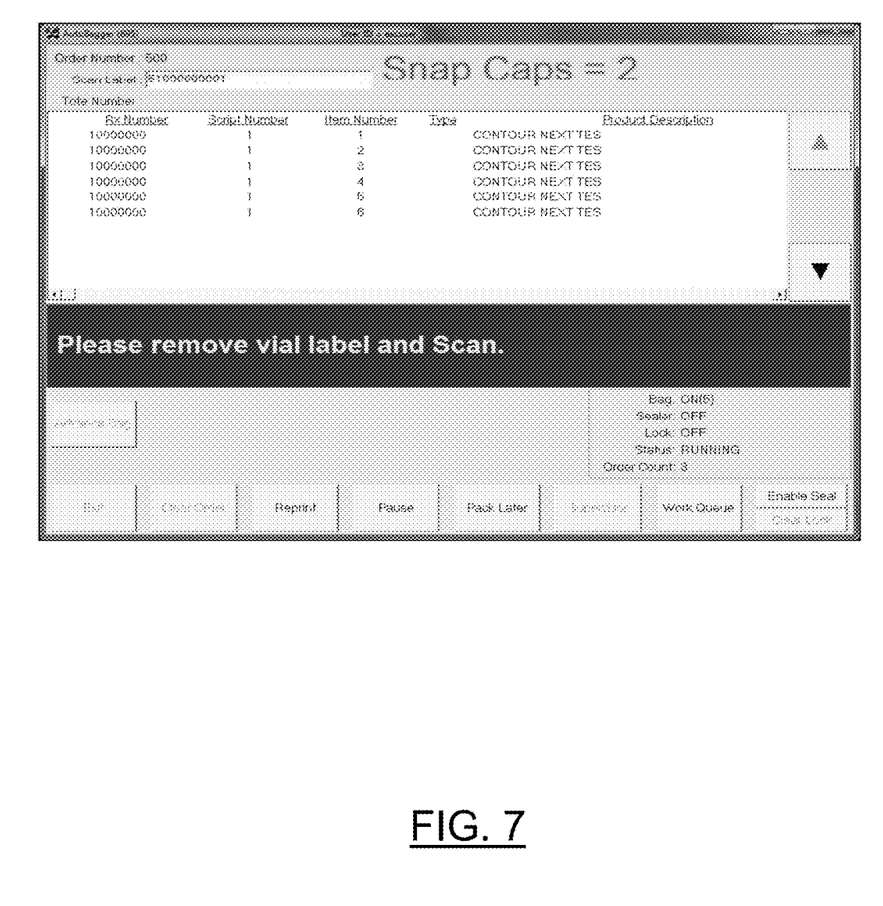
FIG. 7 is another illustration of an operator screen of a user interface for a dispensing system workstation according to an example embodiment of the present invention.

With a scanned product at 450 properly corresponding to the paperwork of 445, one or more labels may be printed at 455. One of the one or more printed labels may be affixed to the product whereupon the printed/affixed label is scanned at 460, such as by identifying apparatus 235. The operator may be instructed to scan the printed/affixed label via the display 310 of the workstation 300 in order to confirm the printed/affixed label appropriately matches the retrieved product. The process of labeling and scanning of the label may be conveyed to a user, such as by instructions generated by processor 200 and presented via the display, such as via an interface of which an example is provided in FIG. 7 depicting the instructions to label the vial and scan the printed label. Provided the printed/affixed label does appropriately match the retrieved product, as determined by controller 125, the operator may be instructed by the display 310 to place the product into a bag and seal the bag to complete the dispensing process at 465. In an example embodiment in which a label of the one or more labels is printed to be affixed to the bag, an operator may attach the label to the bag before, during, or after placing the product in the bag. Optionally, the label may be used to seal the bag such that the label is applied after the bag is filled. If there is a label printed for the bag, it too may be scanned at 460 to ensure that the appropriate label matching the order is being affixed to the bag at 465. Upon completing the dispensing process, where the labeled product is placed into a bag and sealed, the sealed, bagged, and labeled product may be advanced, such as via conveyor 350, to a packaging area where the product is packaged and shipped to the recipient or to a distributor. The process repeats at 450 (or 455, which may be transposed as described above) through 465 until all of the orders in the order queue are fulfilled. Optionally, the label printed at 455 may be affixed to the bag of operation 465 and scanned for confirmation prior to sealing the bag and completing the packaging operation. The operation may return to 445 where paperwork corresponding to the next order is printed and scanned.

According to some embodiments of the present invention, an automated bagging system may be implemented for bagging the dispensed product. A bag label may be printed onto the bag and the barcode scanned by the system in response to the label being printed onto the bag, either directly to the bag, to a blank label already on the bag (e.g., a direct thermal label), or to a label that is automatically adhered to the bag. The scanning of the label of the bag ensures identity of the order corresponding to the bag presently in the automated bagging system. This may occur, for example, prior to operation 445 of FIG. 4, upon an order being generated for fulfillment by the operator. Once the bag label is printed or during printing, the operator may be instructed to remove the order specific paperwork at 445. The paperwork retrieved may also be scanned at 445. As noted above, in response to the paperwork not corresponding to the order and/or the order that is printed to the bag, an error may be triggered requiring pharmacist intervention at 453. Paperwork that is scanned corresponding to the anticipated paperwork may result in an operator being instructed to scan the product at 450. A label may be printed at 455 in response to the correct paperwork being scanned at 445, or optionally, in response to a correct product being scanned at 450. Should the product scan at 450 be improper (i.e., failing to correspond to the order), an error may be triggered requiring pharmacist intervention at 453. If the product scan is correct, the operator may be instructed to place the product in the bag and to seal the bag. In some cases, orders may involve quantities of the product and may require multiple products to be scanned and inserted into the bag ahead of sealing of the bag.

When all of the orders for products in the batch of products are filled, the pharmacist may be notified such that the pharmacist may return to the workstation to verify that the workstation is clear with no product remaining, as shown at 405, for the process to begin again for the next order queue for the next product type in the system.

Figure 8:
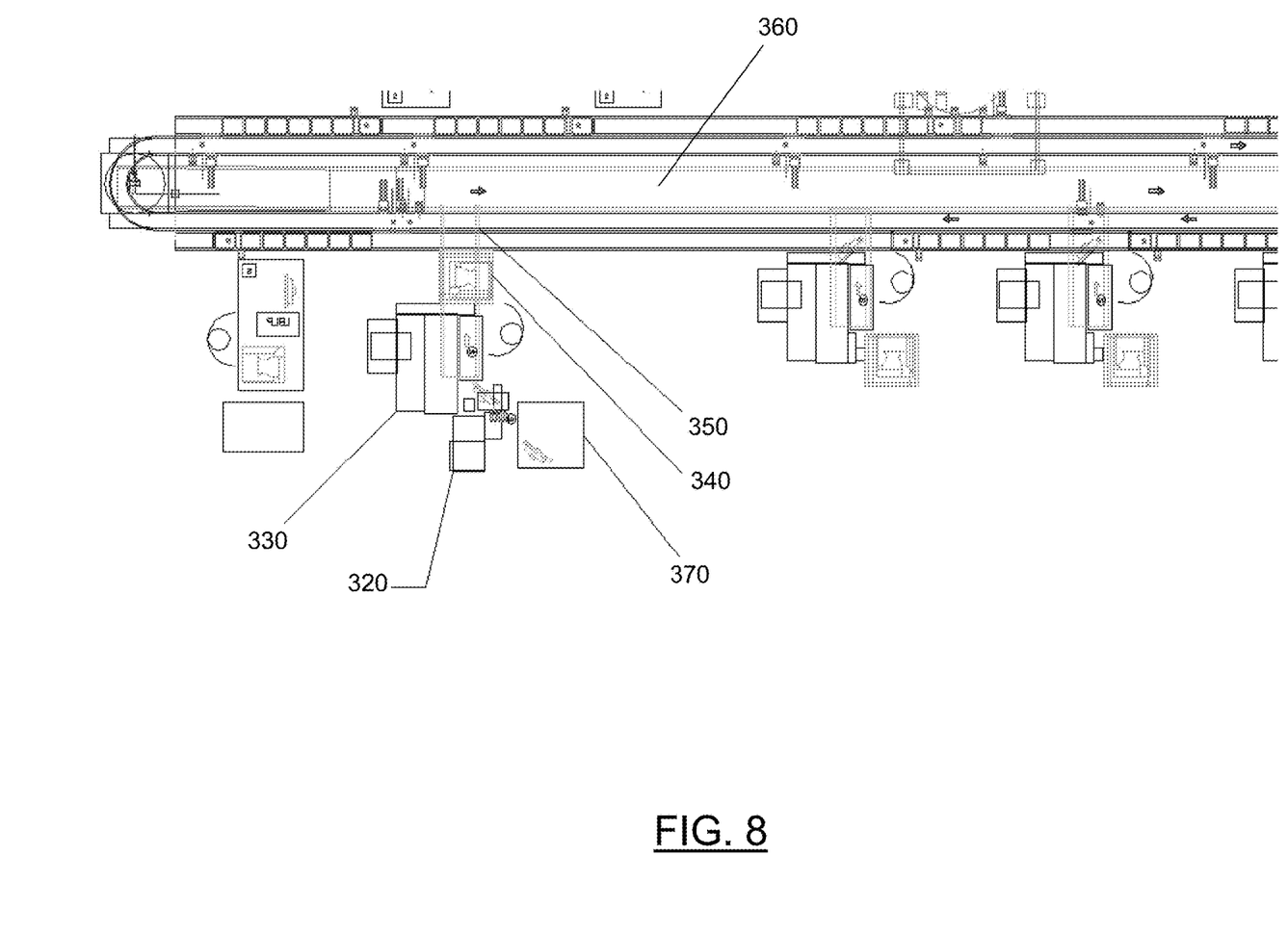
FIG. 8 is a diagram of a plurality of dispensing system workstations arranged in a distribution center according to an example embodiment of the present invention.

While FIG. 3 illustrates a single workstation 300 for a dispensing system which may be implemented in a distribution center, embodiments may include a plurality of workstations as shown in FIG. 8, each configured to be staffed by an operator and to fulfill orders for products, where each workstation handles only a single product at a time, and where product batch changes occur only after confirmation by a pharmacist that the workstation is clear and identification of the new order queue to fill. As depicted, a central conveyor 360 may be configured to receive bagged and labeled products from discharge conveyor 350, and to advance those orders to a packaging and shipping station. An arrangement such as this may promote faster, more accurate, and more efficient filling of prescriptions at a distribution center, while minimizing the number of manual steps requiring a pharmacist to perform them.

Figure 9:
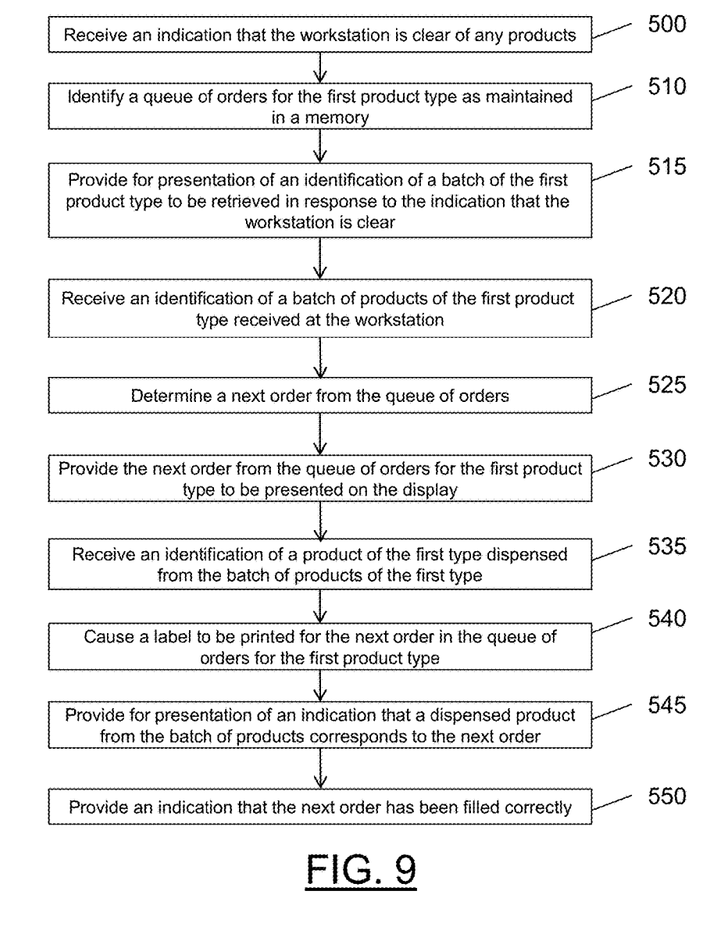
FIG. 9 is a flowchart of a method for operating a dispensing system according to an example embodiment of the present invention.

FIG. 9 illustrates a flowchart of operations of a dispensing system according to an example embodiment of the present invention. As illustrated, an indication that the workstation is clear of any products may be received at 500. This indication, which may be received via user interface 205 of controller 125 of the dispensing system, may be provided by an individual with the proper authority to indicate that the workstation is clear. That authority may be reserved for a credentialed pharmacist, ensuring that no products remain from prior dispensing operations. At 510, a queue of orders may be identified. This queue of orders may be maintained in a memory and may be representative of orders for a particular type of product as received in an order database (e.g., in storage device 225) and filtered according to the first product type by the processor 200. An identification of a batch of the first product type to be retrieved may be presented at 515, such as on display 210, in response to receiving the indication that the workstation is clear and in response to identifying the queue of orders. Once the batch is retrieved, an identification of the batch of the first product type may be received at the workstation at 520, such as using a barcode scanner (e.g., identifying apparatus 235) to scan an identifying barcode.

Once the workstation has received the batch of the first product type, a next order from the queue of orders may be determined at 525, for example by the processor 200 and presented on the display 210 as depicted in 530. An identification of the product of the first product type dispensed from the batch of products may be received at 535. This identification may be from a barcode, as may be read by identifying apparatus 235. A label may be printed for the next order in the queue of orders for the first product type as shown at 540, and this operation may be performed in response to receiving the identification received at 535. If the identification received at 535 does not correspond to the product type of the next order, an alert may be generated requiring pharmacist intervention since no products of any type other than the first product type should be at the station. An indication that a dispensed product from the batch of products corresponds to the next order may be presented, such as on display 210. This may confirm to an operator of the workstation that the next order was filled properly, as depicted in 545, and an indication may be provided that the next order has been properly filled at 550. Conversely, if the order is not filled properly, a warning may be provided that informs the operator of an issue that requires resolution.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A dispensing system comprising:
   a display;
   a workstation;
   a user interface; and
   a controller, wherein the controller is configured to:
   receive a plurality of orders for a plurality of different product types;
   group the plurality of orders into a plurality of queues, each queue corresponding to a particular product type of the order, wherein each queue only includes a single product type;
   receive an indication that the workstation is clear;
   identify a queue of orders of the plurality of queues for a first product type as maintained in a memory;
   identify that the queue of orders for the first product type is batch-fill eligible;
   provide for presentation on the display of an identification of a batch of the first product type to be retrieved in response to the indication that the workstation is clear, wherein the queue of orders for a first product type is exclusively of the first product type;
   receive an identification of a batch of products of the first product type that is received at the workstation;
   receive an approval of the batch of products from a registered pharmacist in response to the pharmacist confirming that each product of the batch of products is the first product type;
   determine a next order from the queue of orders;
   provide for presentation on the display of the next order of the queue of orders for the first product type;
   receive an identification of a product of the first product type dispensed from the batch of products of the first product type, wherein pharmacist approval is not requested or required for the dispensed product in response to the approval of the batch of products being of the first product type;
   cause a label to be printed for the next order; and
   provide for presentation of an indication that the dispensed product of the first product type corresponds to the next order.

2. The dispensing system of claim 1, wherein providing for presentation of an indication that the dispensed product of the first product type corresponds to the next order comprises determining if the identification of a dispensed product of the first product type corresponds to the next order.

3. The dispensing system of claim 2, wherein receiving an identification of a dispensed product of the first product type comprises receiving data from a barcode on the dispensed product from a barcode scanner in communication with the controller.

4. The dispensing system of claim 1, wherein receiving an identification of a batch of products of a first product type that is received at the workstation comprises receiving an identifier corresponding to a barcode on the retrieved batch of products.

5. The dispensing system of claim 1, wherein the identification of a batch of a first type of product received at the workstation comprises an identification of a registered pharmacist that has confirmed that the batch comprises only products of the first product type.

6. The dispensing system of claim 1, wherein the label is printed in response to the identification of the product of the first product type corresponding to a product of the next order from the queue of orders.

7. The dispensing system of claim 1, wherein the indication that the workstation is clear is received from a registered pharmacist.

8. The dispensing system of claim 1, wherein the controller is further configured to:
   modify the queue of orders for the first product type in the memory to remove the next order in response to the next order being filled; and advance a second order in the queue to become a new next order in the queue of orders stored in the memory.

9. The dispensing system of claim 8, wherein the controller is further configured to:

modify the queue of orders for the first product type in the memory to remove the new next order in response to the new next order being filled, and repeating this operation until the quantity of the first product type in the batch is exhausted.

10. A method of operating a dispensing system comprising a workstation, a display, and a user interface, the method comprising:

receiving a plurality of orders for a plurality of different product types;

grouping the plurality of orders into a plurality of queues, each queue corresponding to a particular product type of the order, wherein each queue only includes a single product type;

receiving an indication, via the user interface, that the workstation is clear of any products;

identifying a queue of orders of the plurality of queues for a first product type as maintained in a memory;

identifying that the queue of orders for the first product type is batch-fill eligible;

providing for presentation of an identification of a batch of the first product type to be retrieved in response to the indication that the workstation is clear, wherein the queue of orders for a first product type is exclusively of the first product type;

receiving an identification of a batch of products of the first product type received at the workstation;

receiving confirmation that each product in the batch of products is of the first product type;

receiving an approval of the batch of products from a registered pharmacist in response to the pharmacist confirming that each product of the batch of products is the first product type;

determining a next order from the queue of orders;

providing, on the display, the next order from the queue of orders for the first product type;

receiving an identification of a product of the first product type dispensed from the batch of products of the first product type, wherein pharmacist approval is not requested or required of the dispensed product in response to the approval of the batch of products being of the first product type;

causing a label to be printed for the next order in the queue of orders for the first product type; and providing an indication that the next order has been filled correctly.

11. The method of claim 10, further comprising:

providing for display of an indication that the product dispensed from the batch of products is of the first product type in response to the identification received corresponding to the first product type.

12. The method of claim 10, wherein receiving an identification of the dispensed product comprises receiving a scanned identification from a barcode scanner.

13. The method of claim 10, wherein the confirmation that each product in the batch of products is of a first product type is received from a registered pharmacist.

14. The method of claim 10, wherein causing a label to be printed for the next order in the queue of orders is performed in response to the identification of the product of the first product type corresponding to the product of the next order.

15. The method of claim 10, further comprising:

providing for presentation on the display of an indication that a retrieved product from the batch of products does not correspond to the next order in the queue of orders for the first product; and providing an alert in response to the retrieved product not corresponding to the next order.

16. The method of claim 10, further comprising: advancing the next order via a conveyor to a packaging station.

17. The method of claim 10, further comprising:

modifying the queue of orders for the first product type in the memory to remove the next order in response to the order being filled; and advancing a second order in the queue to become a new next order in the queue of orders stored in the memory.

18. A computer program product comprising at least one non-transitory computer-readable storage medium having computer-executable program code instructions stored therein, the computer-executable program code instructions comprising:

program code instructions for receiving a plurality of orders for a plurality of different product types;

program code instructions for grouping the plurality of orders into a plurality of queues, each queue corresponding to a particular product type of the order wherein each queue only includes a single product type;

program code instructions for receiving an indication, via the user interface, that the workstation is clear of any products;

program code instructions for identifying a queue of orders of the plurality of queues for a first product type as maintained in a memory, wherein the queue of orders for a first product type is exclusively of the first product type;

program code instructions to identify that the queue of orders for the first product type is batch-fill eligible;

program code instructions for providing for presentation of an identification of a batch of the first product type to be retrieved in response to the indication that the workstation is clear;

program code instructions for receiving an identification of a batch of products of the first product type received at the workstation;

program code instructions for receiving confirmation that each product in a batch of products is of a first product type;

program code instructions for receiving an approval of the batch of products from a registered pharmacist in response to the pharmacist confirming that each product of the batch of products is the first product type;

program code instructions for determining a next order from the queue of orders;

program code instructions for providing, on the display, the next order from the queue of orders for the first product type;

program code instructions for receiving an identification of a product of the first product type dispensed from the batch of products of the first product type, wherein pharmacist approval is not requested or required for the dispensed product in response to the approval of the batch of products being of the first product type;

program code instructions for causing a label to be printed for the next order in the queue of orders for the first product type; and program code instructions for providing an indication that the next order has been filled correctly.

19. The computer program product of claim 18, further comprising program code instructions for providing for display of an indication that the product dispensed from the batch of products is of the first product type in response to the identification received corresponding to the first product type.

20. The computer program product of claim 19, wherein the program code instructions for receiving an identification of the dispensed product comprises program code instructions for receiving a scanned identification from a barcode scanner.

\* \* \* \* \*